US010227100B2

(12) United States Patent
Vik et al.

(10) Patent No.: US 10,227,100 B2
(45) Date of Patent: Mar. 12, 2019

(54) WHEEL DESIGNS FOR USE WITHIN A TRACK ASSEMBLY OF A WORK VEHICLE

(71) Applicant: CNH Industrial America, LLC, New Holland, PA (US)

(72) Inventors: Brian Vik, Barnesville, MN (US); David L. Tveito, West Fargo, ND (US); Russell V. Stoltman, Argusville, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/265,969

(22) Filed: Sep. 15, 2016

(65) Prior Publication Data

US 2018/0072358 A1 Mar. 15, 2018

(51) Int. Cl.
*B62D 55/14* (2006.01)
*B62D 55/088* (2006.01)
*B62D 55/065* (2006.01)

(52) U.S. Cl.
CPC ........... *B62D 55/14* (2013.01); *B62D 55/065* (2013.01); *B62D 55/088* (2013.01)

(58) Field of Classification Search
CPC .. B62D 55/14; B62D 55/088; B62D 55/0885; B60B 25/002; B60B 25/006; B60B 21/021; B60B 21/025; B60C 7/06; B60C 7/105
USPC .............. 301/95.104, 95.105, 95.106, 95.11, 301/63.103, 63.104; 305/136
See application file for complete search history.

(56) References Cited

U.S. PATENT DOCUMENTS

| 1,310,246 A | * | 7/1919 | Moore | .................... B60B 27/00 |
| | | | | 29/894.321 |
| 2,355,743 A | * | 8/1944 | Mueller | ................. B62D 55/14 |
| | | | | 305/136 |
| 3,861,762 A | | 1/1975 | Freedy et al. | |
| | | | (Continued) | |

FOREIGN PATENT DOCUMENTS

| DE | 2645523 B1 * | 4/1978 | ............. B60B 3/002 |
| WO | WO 2007/101639 | 9/2007 | |

OTHER PUBLICATIONS

Prowler—Undercarriage Replacement Parts http://www.prowlertracks.com/undercarriage-replacement-parts/ Retrieved: Sep. 12, 2016 (3 pages).

(Continued)

*Primary Examiner* — Kip T Kotter
(74) *Attorney, Agent, or Firm* — Rickard K. DeMille; Rebecca L. Henkel

(57) ABSTRACT

A track wheel may include a wheel rim having an outer rim wall extending axially between first and second sides of the track wheel. The wheel rim may also include a first side wall extending radially inwardly from the outer rim wall along the first side of the wheel such that an inner end of the first side wall is spaced radially inwardly from the outer rim wall. The track wheel may also include a hub disc extending radially within the wheel rim between an inner end and an outer end. In addition, the track wheel may include a first shield wall extending axially between the inner end of the first side wall and the hub disc. The first shield wall may be spaced radially inwardly from the outer rim wall such that a radial gap is defined between the first shield wall and the outer rim wall.

16 Claims, 9 Drawing Sheets

(56) References Cited

U.S. PATENT DOCUMENTS

| | | | |
|---|---|---|---|
| 4,181,365 A * | 1/1980 | Kawaguchi | B60B 1/10 |
| | | | 301/64.202 |
| 4,286,825 A * | 9/1981 | Sieving | B60B 21/02 |
| | | | 301/63.104 |
| 4,950,030 A | 8/1990 | Kindel et al. | |
| 6,007,166 A | 12/1999 | Tucker et al. | |
| 6,293,631 B1 | 9/2001 | Freeman | |
| 6,371,578 B1 | 4/2002 | Ferguson | |
| 6,435,292 B2 | 8/2002 | Lemke et al. | |
| 7,370,865 B2 | 5/2008 | Vik et al. | |
| 7,832,814 B2 | 11/2010 | Breton | |
| 7,905,559 B2 | 3/2011 | Angot et al. | |
| 8,020,874 B2 | 9/2011 | Kometani et al. | |
| 8,636,286 B2 | 1/2014 | Vik | |
| 8,783,795 B2 | 7/2014 | Brazier | |
| 8,967,737 B2 * | 3/2015 | Zuchoski | B62D 55/14 |
| | | | 305/137 |
| 9,033,430 B2 | 5/2015 | Zuchoski et al. | |
| 9,211,921 B2 | 12/2015 | Zuchoski et al. | |
| 2007/0261898 A1 | 11/2007 | Bessette | |
| 2011/0254363 A1 | 10/2011 | Boivin | |
| 2013/0169024 A1 * | 7/2013 | Schmidt | B60B 3/14 |
| | | | 301/6.8 |
| 2015/0136497 A1 | 5/2015 | Morin | |
| 2016/0031500 A1 * | 2/2016 | Renson | B62D 55/145 |
| | | | 305/136 |

OTHER PUBLICATIONS

Nebraska Tire 02—Agriculture Tires http://www.nebraskatire.com/agriculture Retrieved: Sep. 12, 2016 (4 pages).

Nebraska Tire 01—New Center Pivot/Sprinkler Irrigation Tire and Wheels. http://www.nebraskatire.com/agriculture/pivot Retrieved: Sep. 12, 2014 (4 pages).

* cited by examiner

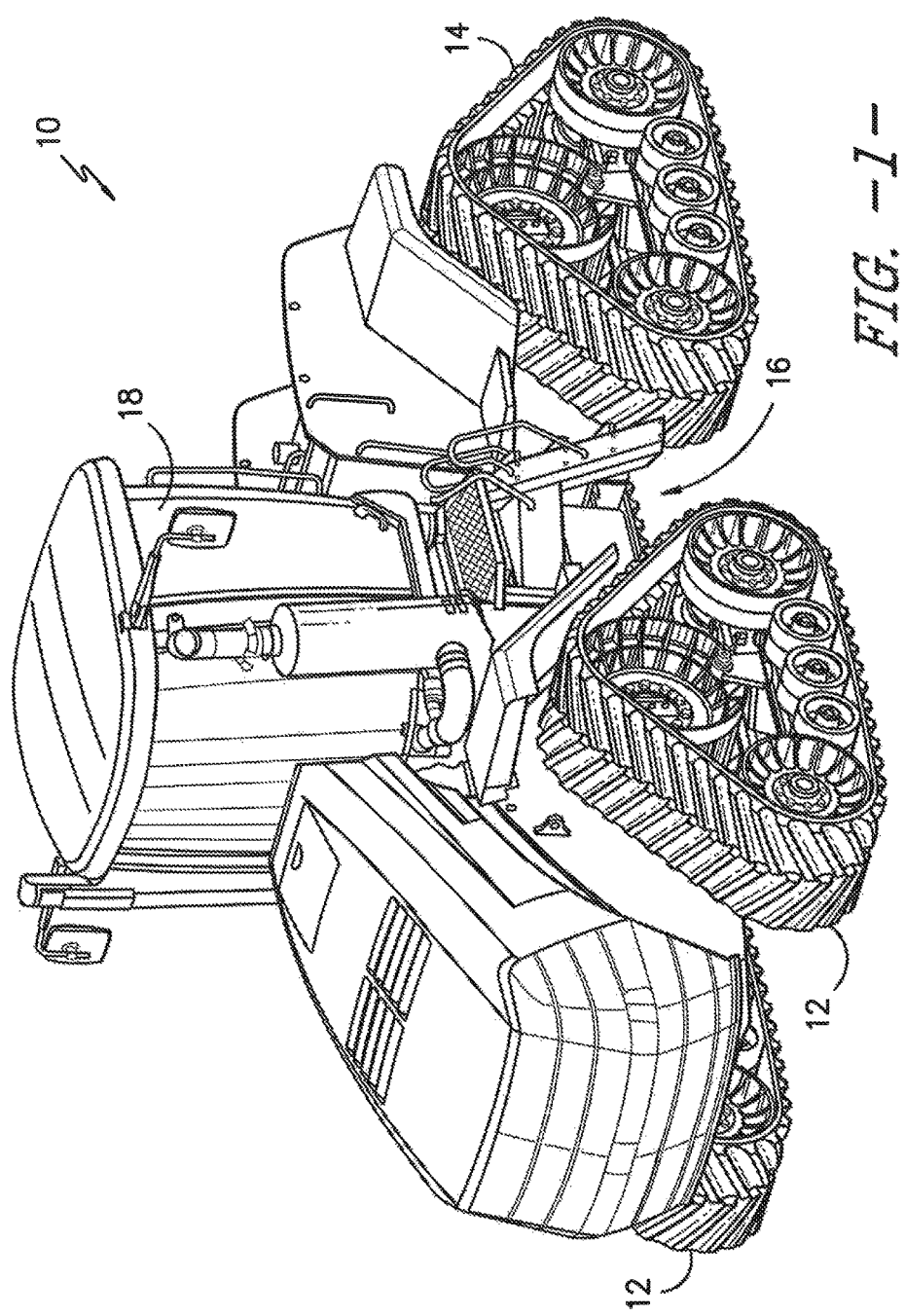

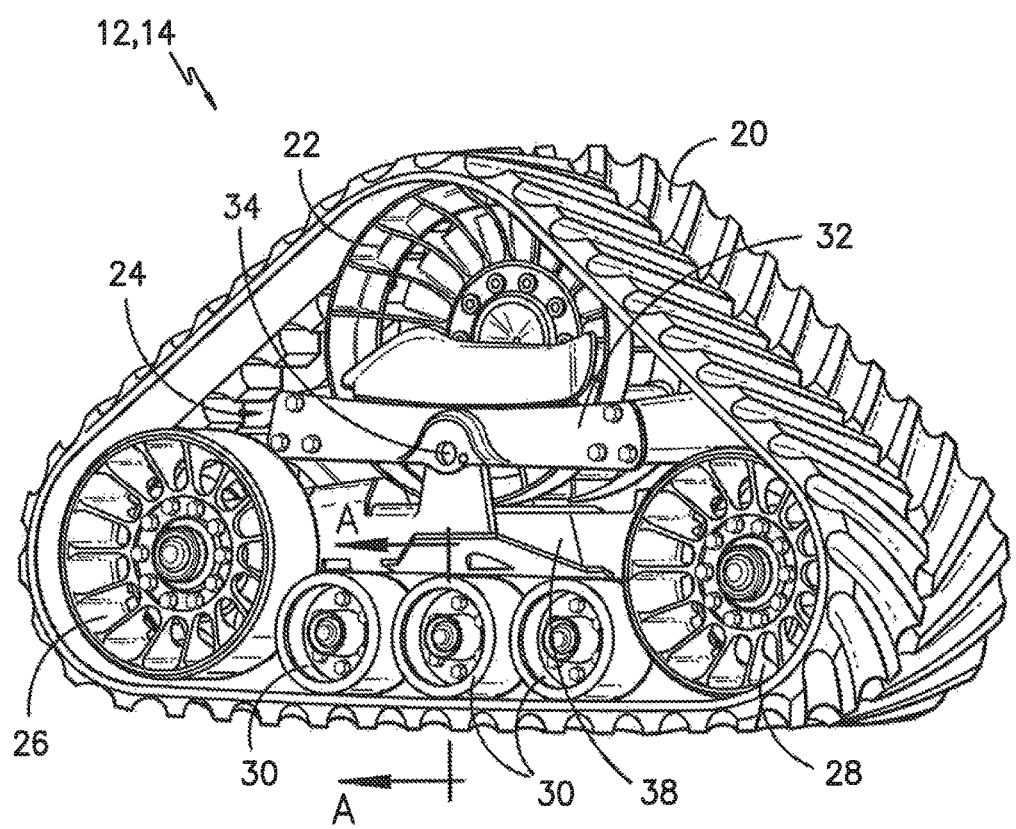
FIG. -2-

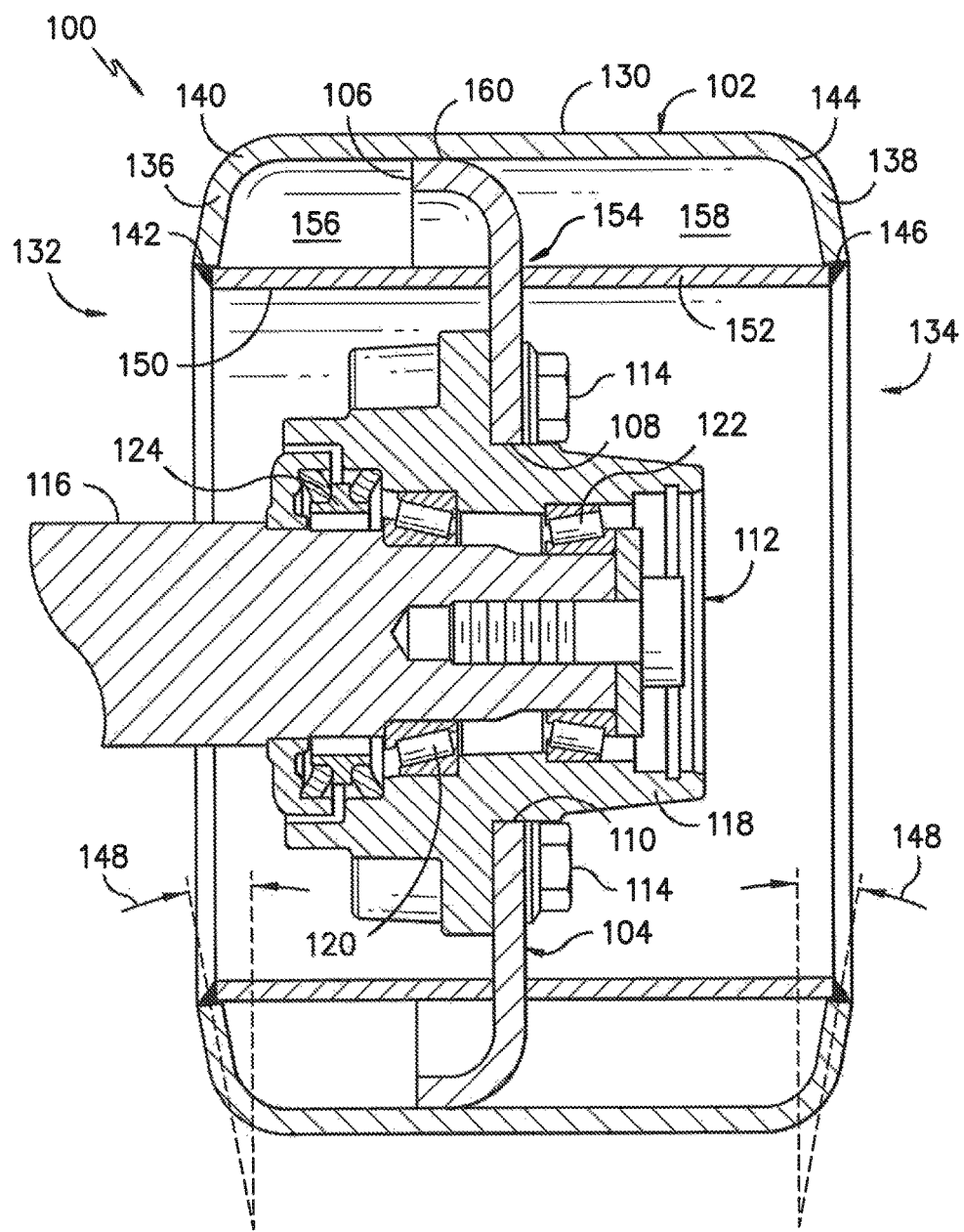
FIG. -3-

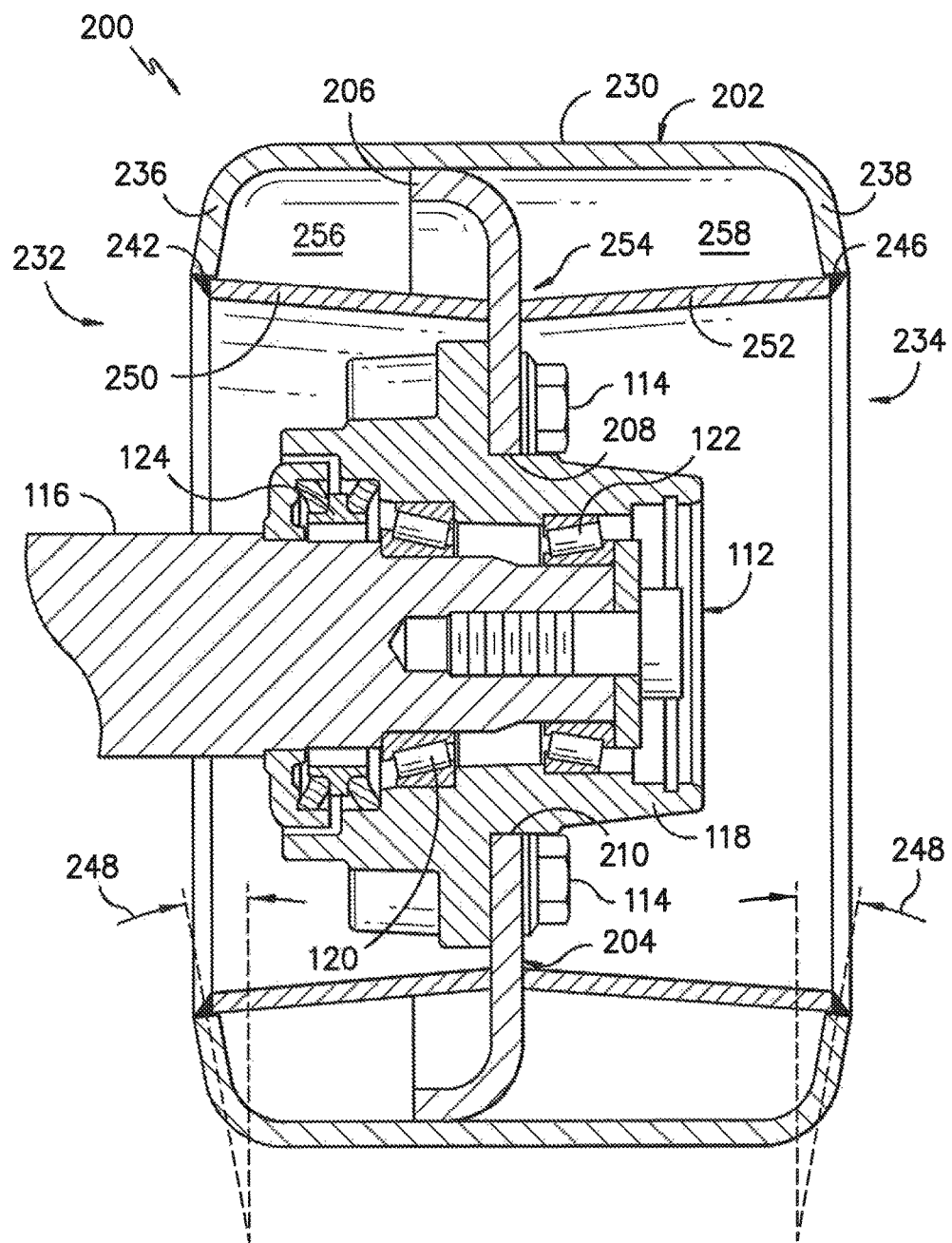
FIG. -4-

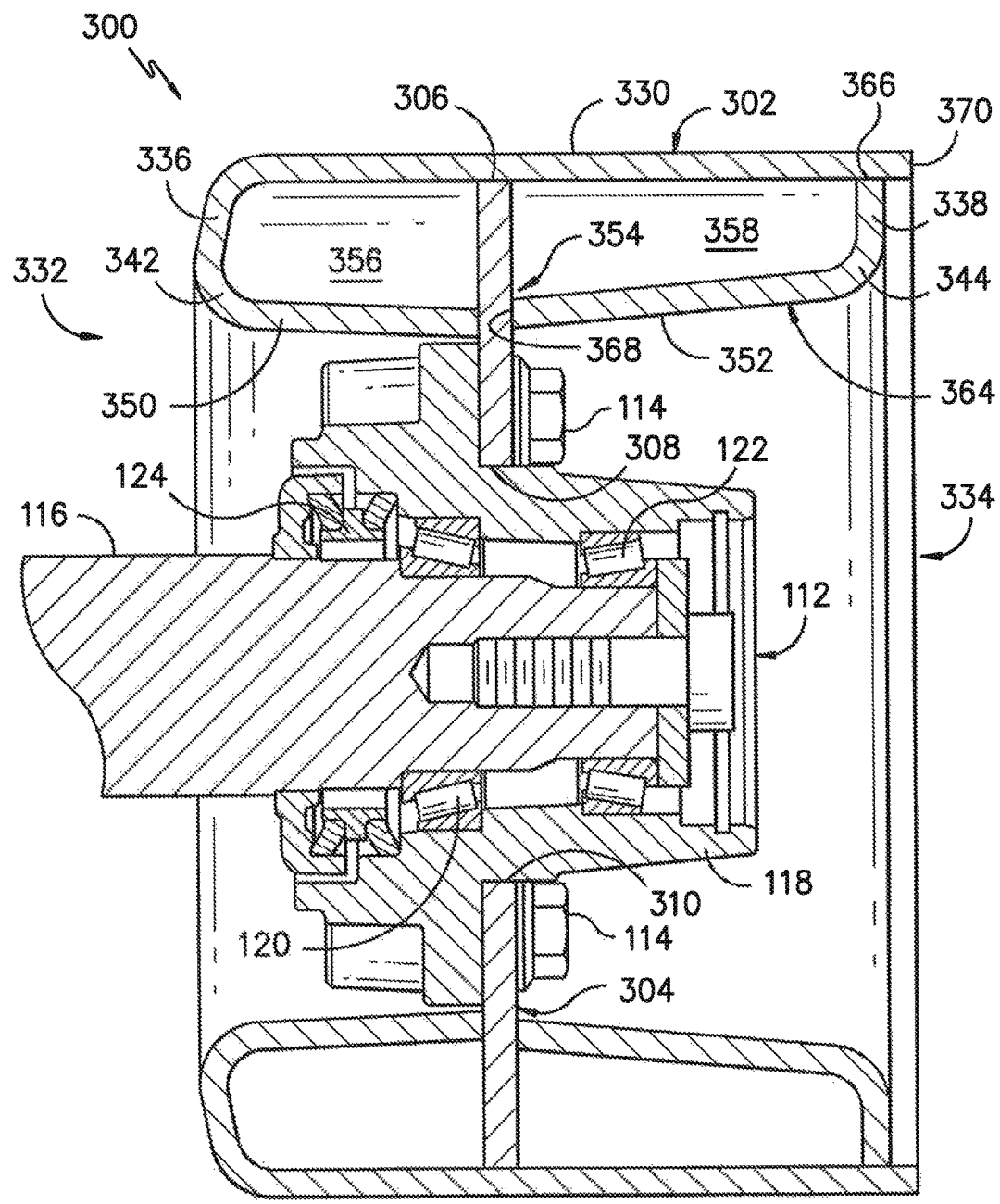
FIG. -5-

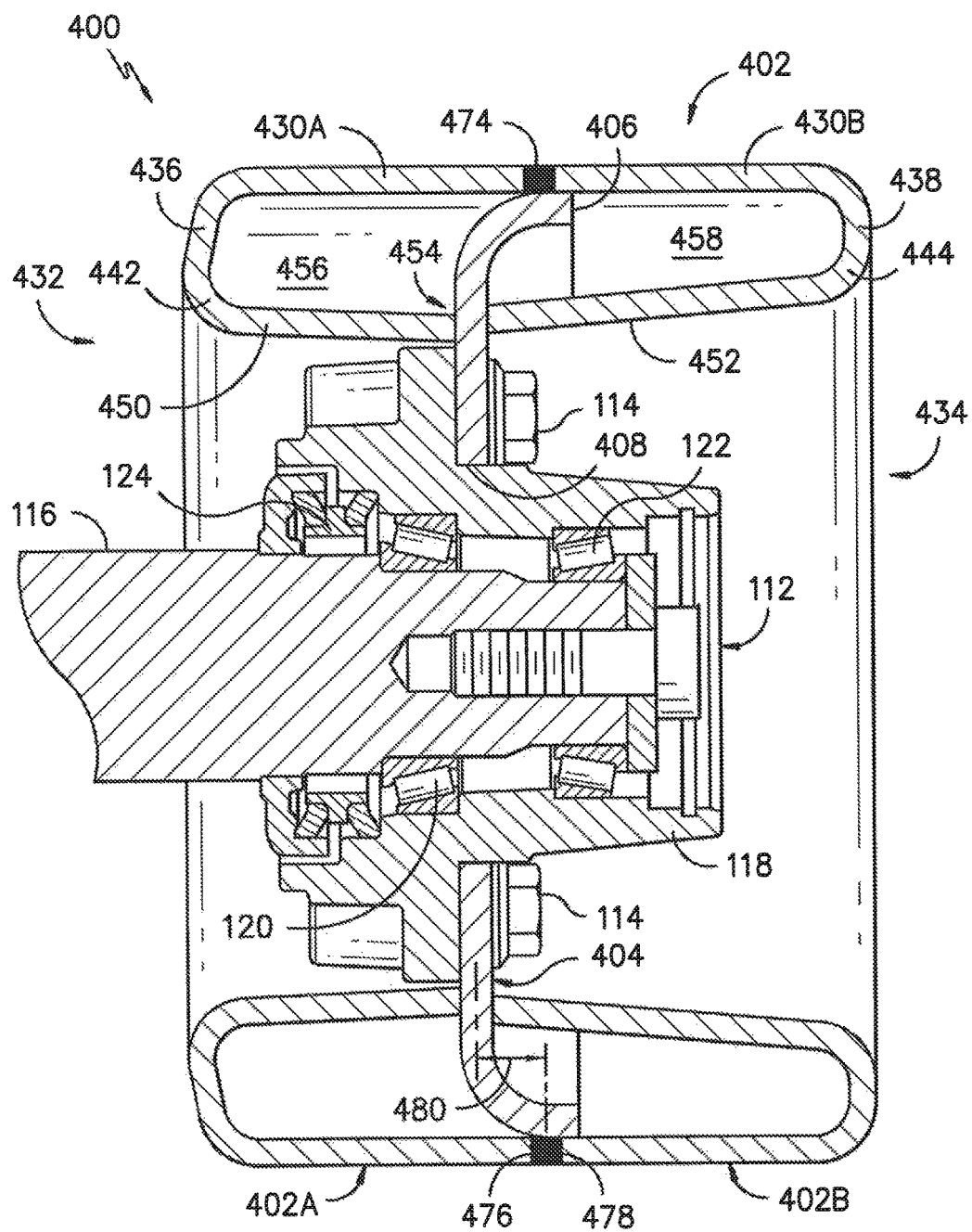
FIG. -6-

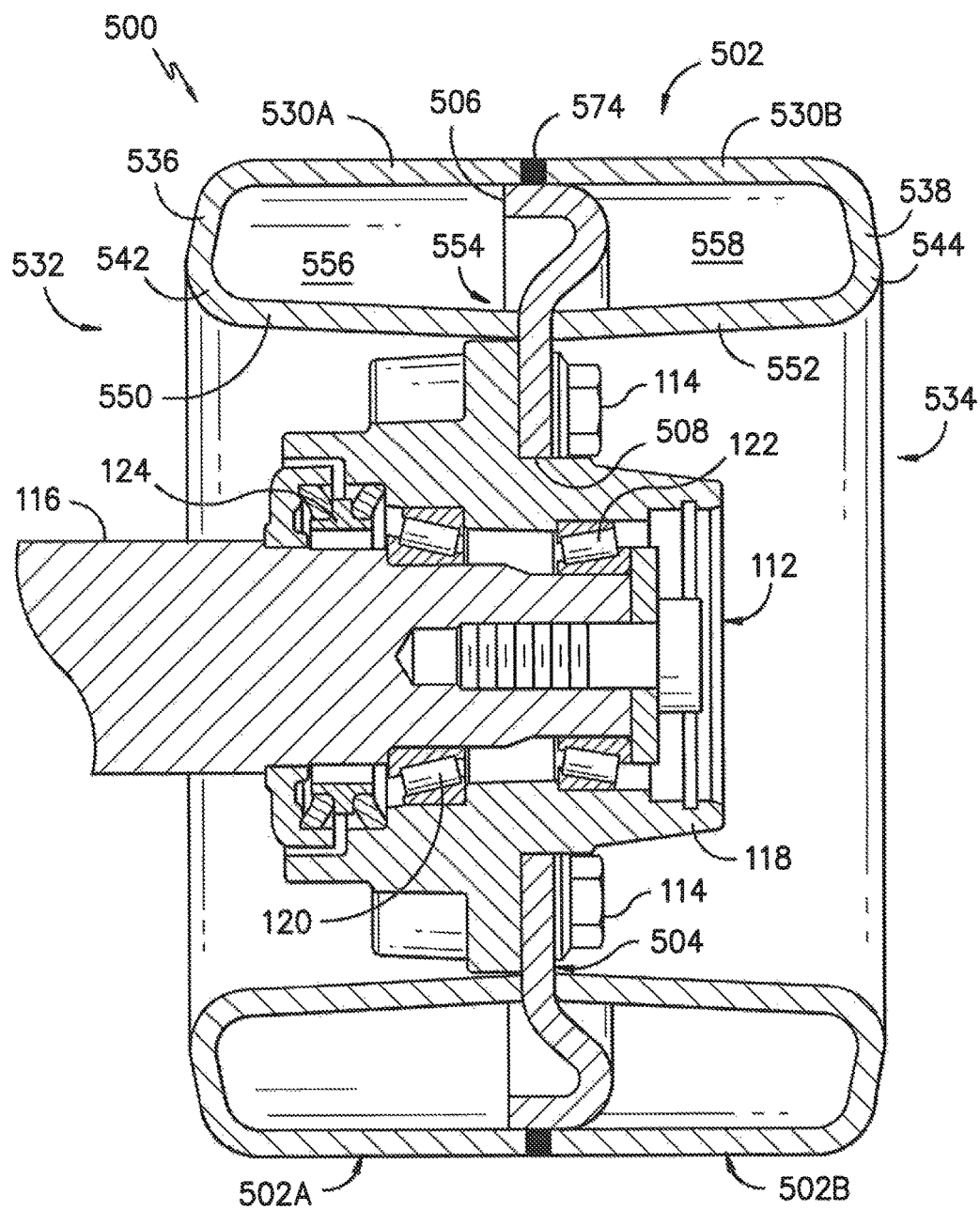
FIG. -7-

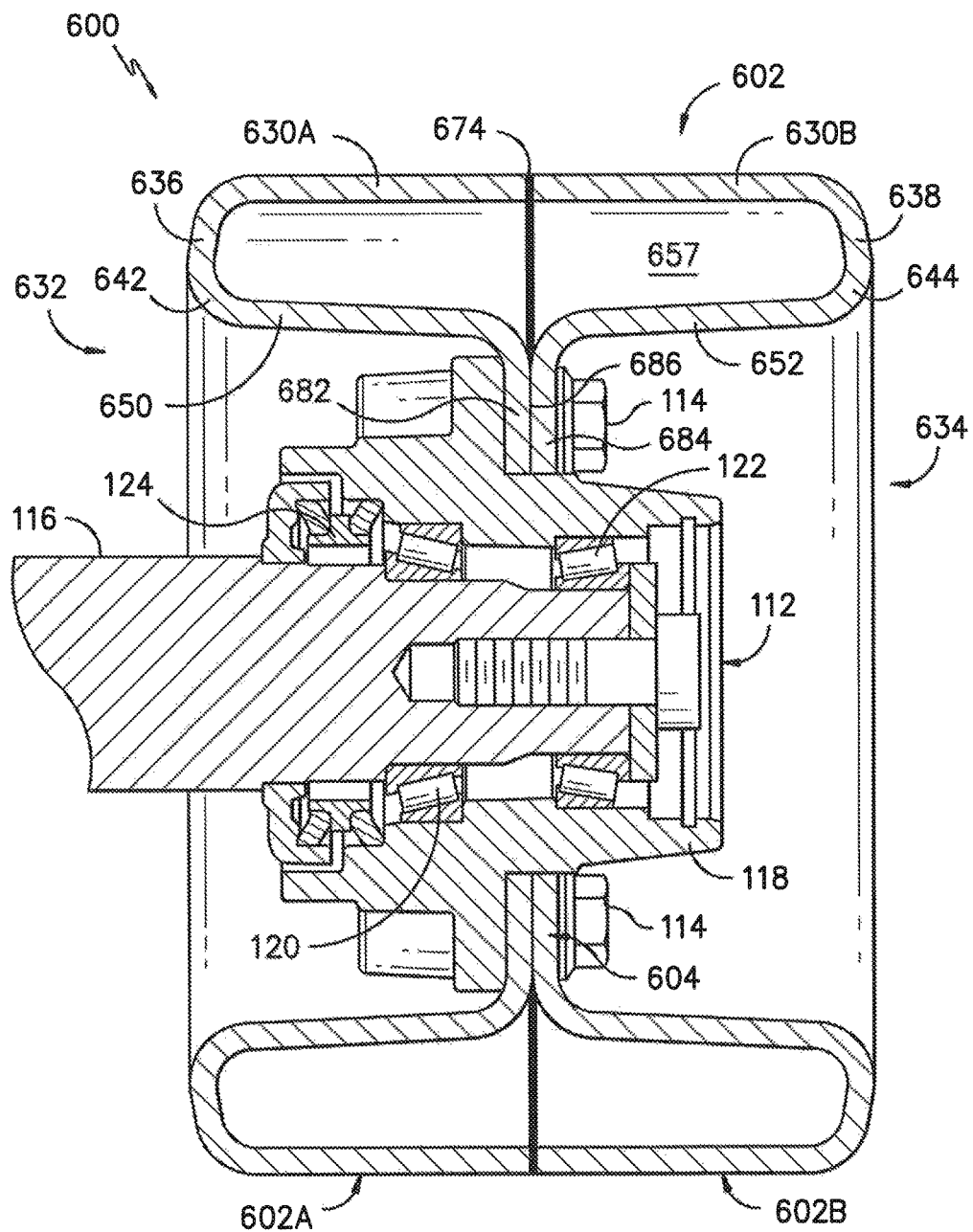
FIG. -8-

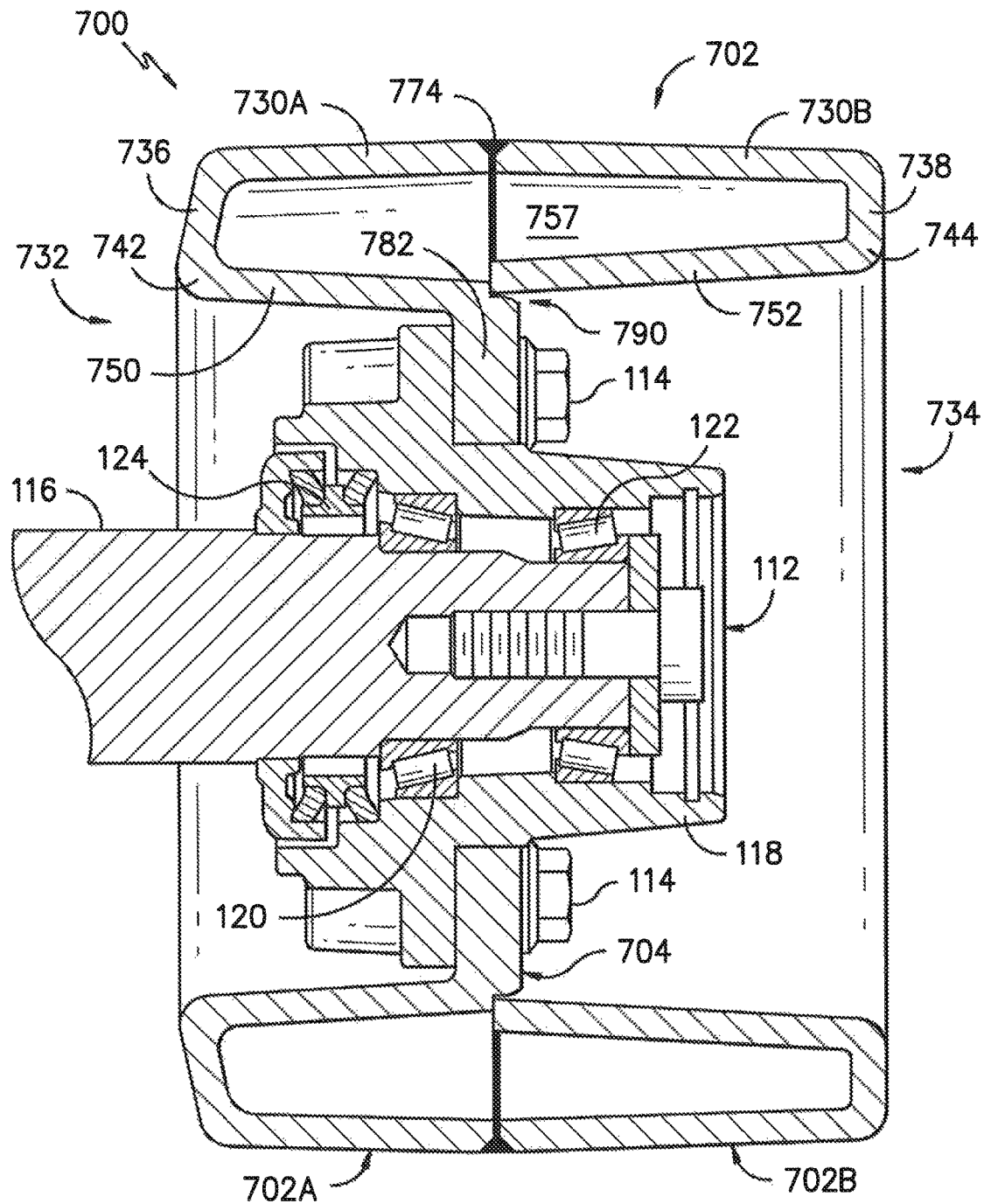
FIG. -9-

# WHEEL DESIGNS FOR USE WITHIN A TRACK ASSEMBLY OF A WORK VEHICLE

FIELD OF THE INVENTION

The present subject matter relates generally to work vehicles and, more particularly, to improved wheel designs for use within a track assembly of a work vehicle.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle assembly for transferring torque from the transmission to the vehicle's wheels or tracks. For instance, for a four-wheel drive track-driven vehicle, a drive wheel of each front track assembly is typically rotationally coupled to a front axle assembly of the work vehicle for transferring torque transmitted from the engine to the front track assembly while a drive wheel of each rear track assembly is typically rotationally coupled to a rear axle assembly of the work vehicle for transferring torque transmitted from the engine to the rear track assembly. As is generally understood, each drive wheel may be configured to rotationally engage a corresponding endless track of the associated track assembly such that rotation of the drive wheel rotates the track, thereby allowing the vehicle to be driven forward or backward. In addition to the drive wheel, each track assembly may include a plurality of other track wheels, such as idler wheels and roller wheels that engage the track as it is rotates around its drive loop.

Due to the typical operating environment for a work vehicle, track assemblies are often exposed to mud and/or debris, which can lead to accumulation of such material within one or more of the components of a track assembly. In particular, the track wheels used within a conventional track assembly typically include a wheel rim that defines radially extending recesses or cavities that are open or otherwise exposed to the operating environment for the work vehicle. As such, conventional track wheel designs currently experience issues with mud/debris build-up within the interior of the wheels. In addition, due to their design, current track wheels are often quite difficult to clean.

Accordingly, an improved wheel design for use within a track assembly of a work vehicle that reduces or eliminates material build-up within the wheel, such as mud or debris build-up, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a track wheel for use within a track assembly of a work vehicle. The track wheel may include a wheel rim having an outer rim wall extending axially between a first side and a second side of the track wheel. The wheel rim may also include a first side wall extending radially inwardly from the outer rim wall along the first side of the wheel such that an inner end of the first side wall is spaced radially inwardly from the outer rim wall. The track wheel may also include a hub disc extending radially within the wheel rim between a radially inner end and a radially outer end. The radially inner end may define a central opening configured to receive at least a portion of a hub assembly of the work vehicle. The radially outer end may be positioned adjacent to a portion of the wheel rim. In addition, the track wheel may include a first shield wall extending axially between the inner end of the first side wall and the hub disc. The first shield wall may be spaced radially inwardly from the outer rim wall such that a radial gap is defined between the first shield wall and the outer rim wall.

In another aspect, the present subject matter is directed to a track wheel for use within a track assembly of a work vehicle. The track wheel may include a wheel rim having an outer rim wall extending axially between a first side and a second side of the track wheel. The wheel rim may also include a first side wall extending radially inwardly from the outer rim wall along the first side of the wheel such that an inner end of the first side wall is spaced radially inwardly from the outer rim wall. The track wheel may also include a hub disc extending radially within the wheel rim between a radially inner end and a radially outer end. The radially inner end may define a central opening configured to receive at least a portion of a hub assembly of the work vehicle. The radially outer end may be positioned adjacent to a portion of the wheel rim. In addition, the track wheel may include means for preventing material accumulation within an interior space of the track wheel, wherein the interior space is defined radially inwardly from the outer rim wall and extends axially between the first side wall and the hub disc.

In a further aspect, the present subject matter is directed to a track assembly for a work vehicle. The track assembly may include a track, a drive wheel configured to rotationally drive the track around a drive loop, and a roller wheel configured to engage the track as the track is driven around the drive loop. The roller wheel may include a wheel rim having an outer rim wall extending axially between a first side and a second side of the roller wheel. The wheel rim may also include a first side wall extending radially inwardly from the outer rim wall along the first side of the wheel such that an inner end of the first side wall is spaced radially inwardly from the outer rim wall. The roller wheel may also include a hub disc extending radially within the wheel rim between a radially inner end and a radially outer end. The radially inner end may define a central opening configured to receive at least a portion of a hub assembly of the work vehicle. The radially outer end may be positioned adjacent to a portion of the wheel rim. The roller wheel may also include a first shield wall extending axially between the inner end of the first side wall and the hub disc. The first shield wall may be spaced radially inwardly from the outer rim wall such that a radial gap is defined between the first shield wall and the outer rim wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a work vehicle in accordance with aspects of the present subject matter;

FIG. 2 illustrates a perspective view of one embodiment of a track assembly suitable for use within the work vehicle shown in FIG. 1 in accordance with aspects of the present subject matter;

FIG. 3 illustrates a cross-sectional view of one embodiment of a track wheel suitable for use within a track assembly of a work vehicle in accordance with aspects of the present subject matter;

FIG. 4 illustrates a cross-sectional view of another embodiment of a track wheel suitable for use within a track assembly of a work vehicle in accordance with aspects of the present subject matter;

FIG. 5 illustrates a cross-sectional view of a further embodiment of a track wheel suitable for use within a track assembly of a work vehicle in accordance with aspects of the present subject matter;

FIG. 6 illustrates a cross-sectional view of yet another embodiment of a track wheel suitable for use within a track assembly of a work vehicle in accordance with aspects of the present subject matter;

FIG. 7 illustrates a cross-sectional view of an even further embodiment of a track wheel suitable for use within a track assembly of a work vehicle in accordance with aspects of the present subject matter;

FIG. 8 illustrates a cross-sectional view of another embodiment of a track wheel suitable for use within a track assembly of a work vehicle in accordance with aspects of the present subject matter; and FIG. 9 illustrates a cross-sectional view of a further embodiment of a track wheel suitable for use within a track assembly of a work vehicle in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to improved wheel designs for use within a track assembly of a work vehicle. Specifically, in several embodiments, the disclosed track wheel may include a wheel rim and a hub disc extending radially within the wheel rim for coupling the track wheel to a hub assembly associated with the track assembly. Additionally, the track wheel may include a means for preventing material accumulation within an interior space defined within the wheel rim. Specifically, in accordance with aspects of the present subject matter, the track wheel may include at least one shield wall extending between a portion(s) of the wheel rim and the hub disc that serves as a barrier or shield for preventing mud and/or other debris from entering the radial space defined between the shield wall(s) and the wheel rim. For instance, in several embodiments, the track wheel may include a first shield wall extending axially from a first side of the wheel to the hub disc to prevent mud/debris or other material accumulation within a radial, interior space of the track wheel defined along a first axial portion of the wheel rim and a second shield wall extending axially from a second side of the wheel to the hub disc to prevent mud/debris or other material accumulation within a radial, interior space of the track wheel defined along a second axial portion of the wheel rim.

It should be appreciated that, in general, the wheel designs disclosed herein will be described with reference to the roller wheels of a track assembly. However, in other embodiments, the disclosed wheel designs may be utilized with any other suitable track wheels of a track assembly, such as an idler wheel or a drive wheel of a track assembly.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair or rear track assemblies 14 (only one of which is shown), and a chassis 16 coupled to and supported by the track assemblies 12, 14. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like.

Referring now to FIG. 2, a perspective view of an exemplary embodiment of one of the front track assemblies 12, 14 shown in FIG. 1 is illustrated in accordance with aspects of the present subject matter. As shown, the track assembly 12, 14 may generally include a track 20, a drive wheel 22 for mechanically engaging the track 20, and a suspension system 24 for supporting the weight of the work vehicle 10 and for damping vibrations and other movement between the track 20 and the vehicle's chassis 16. In one embodiment, the suspension system 24 may include front and rear idler wheels 26, 28 about which the track 20 is wrapped and a plurality of roller wheels 30 for guiding the track 20 between the idler wheels 26, 28. Additionally, the suspension system 24 may include an undercarriage support beam 32 configured to support the idler wheels 26, 28 and the roller wheels 30 relative to the track 20. For example, as shown in FIG. 2, the undercarriage support beam 32 may extend fore-to-aft within the track assembly 12, 14 to allow the various wheels 26, 28, 30 to be coupled thereto.

As is generally understood, the undercarriage support beam 32 may be pivotally supported on the vehicle chassis 16 (FIG. 1) by two pivot pins, namely an outboard pivot pin 34 and an inboard pivot pin (not shown)). The outboard pivot pin 34 is located outboard of the drive wheel 22 while the inboard pivot pin is located inboard of the drive wheel 22 and is secured on the vehicle chassis 16. In general, the outboard pivot pin 34 may be configured tai be coupled between an undercarriage bearing support member 38 and the undercarriage support beam 32. For example, the pivot pin 34 may be configured to be received within both an opening (not shown) defined through the bearing support member 38 and a corresponding outboard opening (not shown) defined in the support beam 32. The bearing support member 38 may, in turn, be secured at each of its ends to support posts (not shown) coupled to the vehicle chassis 16. As such, the outboard pivot pin 34 may serve to pivotally couple the undercarriage support beam 32 to the chassis 16.

It should be appreciated that a similar pivotal support arrangement may also be provided on the vehicle chassis 16 inboard of the drive wheel 22 utilizing the inboard pivot pin. For example, the inboard pivot pin may be configured to be received within a suitable opening (not shown) defined in the undercarriage support beam 32 for pivotally coupling the support beam 32 to the chassis 16.

It should also be appreciated that the track assembly 12, 14 shown in FIG. 2 is simply illustrated to provide one example of a suitable track assembly configuration. In other embodiments, the track assembly 12, 14 may have any other suitable track-based configuration.

Referring now to FIG. 3, a cross-sectional view of one embodiment of a configuration for a track wheel 100 suitable for use within a track assembly of a work vehicle is illustrated in accordance with aspects of the present subject matter. For instance, the track wheel 100 may correspond to one of the roller wheels 30 of the track assembly 12, 14 shown in FIG. 2. In such an embodiment, the cross-sectional view of FIG. 3 may, for example, correspond to a view of one of the roller wheels 30 shown in FIG. 2 taken about line A-A.

As shown in FIG. 3, the track wheel 100 may include a wheel rim 102 and a hub disc 104 extending radially within the wheel rim 102. In general, the hub disc 104 may be configured to extend within the wheel rim 102 between a radially outer end 106 positioned adjacent to the wheel rim 102 and a radially inner end 108 spaced radially inwardly from the wheel rim 102. The inner end 108 of the hub disc 104 may be configured to define a central opening 110 for receiving a portion of a hub assembly 112 of the work vehicle 10. For example, as shown in FIG. 3, a portion of the hub assembly 112 may be configured to extend through the central opening 110 defined by the hub disc 104. In addition, the hub assembly 112 may be configured to be coupled to the hub disc 104 (e.g., using mechanical fasteners 114) such that the track wheel 100 is rotationally supported on a corresponding stationary shaft 116 of the track assembly 12, 14 via the hub assembly 112.

It should be appreciated that the hub assembly 112 may generally have any suitable configuration. For example, as shown in FIG. 3, the hub assembly 112 may include a rotating wheel hub 118 mounted on the stationary shaft 116 to allow the wheel hub 118 (and, thus, the track wheel 100) to rotate about a rotational axis (not shown). In addition, the hub assembly 112 may include one or more bearing assemblies 120, 122 positioned between the wheel hub 118 and the shaft 116. For instance, as shown in FIG. 3, the hub assembly 112 may include both an inboard bearing assembly 120 and an outboard bearing assembly 122 positioned around the shaft 116 so as to define the rotational movement of the wheel hub 118 about the rotational axis. Moreover, as shown in FIG. 3, the hub assembly 112 may also include a face seal set 124 positioned around the shaft 116 that provides a sealing interface at the wheel hub 118 to prevent water, mud and/or other debris from reaching the bearing assemblies 120, 122.

As shown in FIG. 3, the wheel rim 102 may generally include an outer rim wall 130 extending axially between a first side 132 and a second side 134 of the track wheel 100. The outer rim wall 130 may generally have a substantially cylindrical shape so as to define an outer circumferential surface of the wheel track wheel 100. Additionally, the wheel rim 102 may include first and second side walls 136, 138 extending radially inwardly from the outer rim wall 130 along the first and second sides 132, 134 of the track wheel 100, respectively. Specifically, as shown in FIG. 3, the first side wall 136 may extend radially inwardly from the outer rim wall 130 along the first side 132 of the track wheel 100 from a first outer end 140 to a first inner end 142. Similarly, the second side wall 138 may extend radially inwardly from the outer rim wall 130 along the second side 134 of the track wheel 100 from a second outer end 144 to a second inner end 146.

It should be appreciated that, in several embodiments, each of the side walls 136, 138 of the wheel rim 102 may be configured to extend inwardly from the outer rim wall 130 at a given side wall angle 148 relative to the radial direction to facilitate engagement of the side walls 136, 138 with the track 20 of the corresponding track assembly 12, 14. For example, in one embodiment, the angle 148 defined by the side walls 136, 138 of the wheel rim 102 may range from about 5 degrees to about 20 degrees, such as from about 8 degrees to about 16 degrees or from about 10 degrees to about 14 degrees or from about 11 degrees to about 13 degrees and/or any other subranges therebetween.

Additionally, the track wheel 100 may also include means for preventing material accumulation within an interior space defined within the wheel rim 102. Specifically, as shown in FIG. 3, the track wheel 100 may include interior or shield walls 150, 152 extending axially within the track wheel 100 between the side walls 136, 138 and the hub disc 100. For instance, the track wheel 100 may include a first shield wall 150 extending from the inner end 142 of the first side wall 136 to an interior disc position 154 defined on the hub disc 104 at a location radially inwardly from the outer end 106 of the hub disc 104. Similarly, the track wheel 100 may include a second shield wall 152 extending from the inner end 146 of the second side wall 138 to the interior disc position 154 defined on the hub disc 104.

As shown in FIG. 3, the shield walls 150, 152 are spaced radially inwardly from the outer rim wall 130 such that a radial space or gap 156, 158 is defined between each shield wall 150, 152 and the outer rim wall 130. For example, a first radial gap 156 may be defined between the first shield wall 150 and the outer rim wall 130 that defines an enclosed volume extending both radially between the first shield wall 150 and the outer rim wall 130 and axially between the first side wall 136 and the hub disc 104. Similarly, a second radial gap 158 may be defined between the second shield wall 152 and the outer rim wall 130 that defines an enclosed volume extending both radially between the second shield wall 152 and the outer rim wall 130 and axially between the second side wall 138 and the hub disc 104. In one embodiment, the enclosed volumes defined by the first and second radial gaps 156, 158 may be hollow. Alternatively, the enclosed volumes may be filled with a filler material, such as a lightweight foam or core material.

In general, the shield walls 150, 152 may be configured to extend axially between the sidewalls 136, 138 and the hub disc 104 so as to provide a barrier or shield that prevents mud/debris or other material build-up along the interior surface of the wheel rim 102. Specifically, each shield wall 150, 152 may be configured to block mud and other debris from entering the radial spaces or gaps 156, 158 defined between the shield walls 150, 152 and the outer rim wall 130, thereby preventing the mud/debris from reaching the locations within the track wheel 100 that are difficult to clean or otherwise access. As such, the ability to maintain the track wheel 100 clean may be greatly enhanced.

As shown in FIG. 3, in several embodiments, the shield walls 150, 152 may correspond to separate components of the track wheel 100. In such embodiments, the interior axial end of each shield wall 150, 152 may be coupled to the hub disc 104 at the interior disc position 154 and the opposed exterior axial end of each shield wall 150, 152 may be coupled to the inner end 142, 146 of its corresponding side wall 136, 138. For instance, the shield walls 150, 152 may be coupled between the side walls 136, 138 and the hub disc 104 by welding the components together and/or by using any other suitable attachment means and/or method that provides a liquid tight seal between the wheel rim 102 and the hub disc 104, thereby preventing water and other liquids from entering the radial gaps 156, 158 defined between the shield walls 150, 152 and the outer rim wall 130. Alternatively, as will be described below, one or both of the shield walls 150, 152 may be formed integrally with a portion of the wheel rim 102, such as by forming the first shield wall 150 integrally with the first side wall 136 and/or by forming the second shield wall 152 integrally with the second side wall 138. In such an embodiment, the wheel rim 102 may, for example, be bent or otherwise formed such that a portion(s) of the rim 102 extends axially from the inner end(s) 142, 146 of the side wall(s) 136, 138 in order to form the shield wall(s) 150, 152.

It should be appreciated that the shield walls 150, 152 may generally be configured to define any suitable axial and/or radial profile between the side walls 136, 138 of the wheel rim 102 and the hub disc 104. For instance, in the illustrated embodiment, each shield wall 150, 152 defines a substantially cylindrical shape between its corresponding side wall 136, 138 and the hub disc 104 such that the shield wall 150, 152 has a substantially constant diameter between its opposed axial ends. However, as will be described below, each shield wall 150, 152 may, in an alternative embodiment, define a coned or tapered profile between its opposed axial ends.

Additionally, as shown in FIG. 3, in one embodiment, the radially outer end 106 of the hub disc 104 may be configured to be positioned directly adjacent to the outer rim wall 130 of the wheel rim 102 such that a circumferential interface 160 is defined between the outer rim wall 130 and the hub disc 104. In such an embodiment, the outer end 106 of the hub disc 104 may be coupled to the outer rim wall 130 around the circumferential interface 160, such as by welding the outer end 106 of the hub disc 104 to the outer rim wall 130. Alternatively, the outer end 106 of the hub disc 104 may be configured to terminate at any other suitable radial location within the track wheel 100, such as at the location of the interior axial ends of the shield walls 150, 152. In such an embodiment, the shield walls 150, 152 may be coupled to the outer end 106 of the hub disc 104.

Moreover, in one embodiment, the hub disc 104 may define a contoured or non-planar profile at or adjacent to its radially outer end 106. For instance, as shown in FIG. 3, an outer portion of the hub disc 104 may be bent or otherwise formed to extend in the axial direction such that the outer end 106 of the hub disc 104 is axially offset from the inner end 108 of the hub disc 104. Such a contoured hub disc 104 may, in certain instances, provide enhanced load capabilities to the track wheel 100. However, as will be described below, the hub disc 104 may, in alternative embodiments, define a planar profile such that the outer end 106 of the hub disc 104 is axially aligned with the inner end 108 of the hub disc 104.

Referring now to FIG. 4, a cross-sectional view of another embodiment of a configuration for a track wheel 200 suitable for use within a track assembly of a work vehicle is illustrated in accordance with aspects of the present subject matter. For instance, the track wheel 200 may correspond to one of the roller wheels 30 of the track assembly 12, 14 shown in FIG. 2. In such an embodiment, the cross-sectional view of FIG. 4 may, for example, correspond to a view of one of the roller wheels 30 shown in FIG. 2 taken about line A-A. It should be appreciated that, in the following description of FIG. 4, any elements, features, and/or components related to the track wheel 200 that are similar to those shown in the embodiment of FIG. 3 have been designated with the same reference numbers increased by 100 (or a multiple of 100) and redundant description has been omitted. Additionally, for purposes of illustration, the components of the hub assembly 112 shown in FIG. 4 have been designated with the same reference characters from FIG. 3.

As shown in FIG. 4, similar to the embodiment described above, the track wheel 200 may include a wheel rim 202 having an outer rim wall 230 that defines an outer circumferential surface of the track wheel 200, a first side wall 236 extending radially inwardly from the outer rim wall 230 along a first side 232 of the track wheel 200 to a first inner end 242 of the first side wall 236, and a second side wall 238 extending radially inwardly from the outer rim wall 230 along a second side 234 of the track wheel 200 to a second inner end 246 of the second side wall 238. Similar to that described above, the first and second side walls 236, 238 may each be configured to extend inwardly from the outer rim wall 230 at a given side wall angle 248, such as an angle 248 ranging from about 5 degrees to about 20 degrees. Additionally, the track wheel 200 may include a hub disc 204 extending radially within the interior of the wheel rim 202 between a radially outer end 206 and a radially inner end 208, with the outer end 206 being coupled to the outer rim wall 230 of the wheel rim 202 and the inner end 208 defining a central opening 210 configured to receive a portion of the hub assembly 112.

Moreover, the track wheel 200 may also include means for preventing material accumulation within an interior space defined within the wheel rim 202. Specifically, as shown in FIG. 4, the track wheel 200 may include first and second interior or shield walls 250, 252 extending axially within the track wheel 200 between the side walls 236, 238 and the hub disc 204. For example, the track wheel 200 may include a first shield wall 250 extending from the inner end 242 of the first side wall 236 to an interior disc position 254 defined on the hub disc 204 at a location radially inwardly from the outer end 206 of the hub disc 204. Similarly, the track wheel 200 may include a second shield wall 252 extending from the inner end 246 of the second side wall 238 to the interior disc position 254 defined on the hub disc 204. In general, the shield walls 250, 252 may be configured the same as or similar to the shield walls 150, 152 described above with reference to FIG. 3. For instance, each shield wall 250, 252 may be spaced radially inwardly from the outer rim wall 230 such that a radial space or gap 256, 258 is defined between each shield wall 250, 252 and the outer rim wall 230. For example, a first radial gap 256 may be defined between the first shield wall 250 and the outer rim wall 230 and a second radial gap 258 may be defined between the second shield wall 252 and the outer rim wall 230.

However, unlike the embodiment described above with reference to FIG. 3, each shield wall 250, 252 may define a tapered or coned profile between its opposed axial ends. Specifically, as shown in FIG. 4, each shield wall 250, 252 may, in one embodiment, be tapered or coned inwardly as its extends from its respective side wall 236, 238 towards the hub disc 204. As such, the diameter of each shield wall 250, 252 may be reduced as the shield wall 250, 252 extends axially towards the hub disc 204. For instance, each shield wall 250, 252 may defines its maximum diameter at or adjacent to its respective side wall 236, 238 and may define its minimum diameter at or adjacent to the hub disc 204. Such as tapered or coned configuration may serve to guide any mud/debris received within the interior cavity of the track wheel 100 away from the radial gaps 256, 258 defined between the shield walls 250, 252 and the outer rim wall 230.

Referring now to FIG. 5, a cross-sectional view of a further embodiment of a configuration for a track wheel 300 suitable for use within a track assembly of a work vehicle is illustrated in accordance with aspects of the present subject matter. For instance, the track wheel 300 may correspond to one of the roller wheels 30 of the track assembly 12, 14 shown in FIG. 2. In such an embodiment, the cross-sectional view of FIG. 5 may, for example, correspond to a view of one of the roller wheels 30 shown in FIG. 2 taken about line A-A. It should be appreciated that, in the following description of FIG. 5, any elements, features, and/or components related to the track wheel 300 that are similar to those shown in the embodiment of FIG. 3 and/or FIG. 4 have been designated with the same reference numbers increased by 100 (or a multiple of 100) and redundant description has been omitted. Additionally, for purposes of illustration, the components of the hub assembly 112 shown in FIG. 5 have been designated with the same reference characters from FIGS. 3 and 4.

As shown in FIG. 5, similar to the embodiments described above, the track wheel 300 may include a wheel rim 302 having an outer rim wall 330 that defines an outer circumferential surface of the track wheel 100 and a first side wall 336 extending radially inwardly from the outer rim wall 330 along a first side 332 of the track wheel 300 to a first inner end 342 of the first side wall 336. Additionally, the track wheel 300 may include a hub disc 304 extending radially within the interior of the wheel rim 302 between a radially outer end 306 and a radially inner end 308, with the outer end 308 being coupled to the outer rim wall 330 of the wheel rim 302 and the inner end 308 defining a central opening 310 configured to receive a portion of the hub assembly 112.

Moreover, the track wheel 300 may also include means for preventing material accumulation within an interior space defined within the wheel rim 302. Specifically, as shown in FIG. 5, the track wheel 300 may include first and second interior or shield walls 350, 352 extending axially within the track wheel 300. However, unlike the embodiments described above, the first shield wall 350 is formed integrally with the remainder of the wheel rim 302. Specifically, as shown in FIG. 5, the first shield wall 350 is formed integrally with the first side wall 336 such that the first shield wall 350 defines an extension of the wheel rim 302 extending axially inwardly from the inner end 342 of the first side wall 336 to a corresponding interior disc position 354 defined on the hub disc 304 at a location radially inwardly from the outer end 306 of the hub disc 304.

Additionally, unlike the embodiments described above, the second shield wall 352 is defined by a separate shield component 364 of the track wheel 300 that extends from the outer rim wall 330 to the interior disc position 354 defined on the hub disc 304. Specifically, as shown in FIG. 5, the shield component 364 may extend between a first end 366 coupled to the outer rim wall 330 and a second end 368 coupled to the hub disc 304 at the interior disc position 354. In such an embodiment, the wheel rim 302 may be configured to terminate along a second side 334 of the track wheel 300 at an axial end 370 of the outer rim wall 330. Additionally, as shown in FIG. 5, the shield component 364 may be configured to extend radially inwardly from the outer rim wall 330 (e.g., at a location at or adjacent to the axial end 370 of the outer rim wall 330) so that the shield component 364 forms a side wall 338 along the second side 334 of the wheel 300 that may function similarly to the second side walls 138, 238 described above with reference to FIGS. 3 and 4. In such an embodiment, the second shield wall 352 may be configured to extend axially from an inner end 344 of the side wall 338 of the shield component 364 to the interior disc position 354 defined on the hub disc 304.

As shown in FIG. 5, similar to the embodiments described above, the first and second shield walls 352, 354 may both be spaced radially inwardly from the outer rim wall 330. As such, a first radial gap 356 may be defined between the first shield wall 350 and the outer rim wall 330 and a second radial gap 358 may be defined between the second shield wall 352 and the outer rim wall 330.

Moreover, as shown in FIG. 5, unlike the embodiments described above in which the hub disc has a countered profile, the illustrated track wheel 300 includes a flat or planar hub disc 304. Specifically, as shown, the hub disc 304 defines a planar profile such that the outer end 306 of the hub disc 304 is axially aligned with the inner end 308 of the hub disc 304. However, in other embodiments, the hub disc 304 may define a non-planar profile, such as by configuring the hub disc 304 to have the contoured configuration shown in FIGS. 3 and 4.

Referring now to FIG. 6, a cross-sectional view of yet another embodiment of a configuration for a track wheel 400 suitable for use within a track assembly of a work vehicle is illustrated in accordance with aspects of the present subject matter. For instance, the track wheel 400 may correspond to one of the roller wheels 30 of the track assembly 12, 14 shown in FIG. 2. In such an embodiment, the cross-sectional view of FIG. 6 may, for example, correspond to a view of one of the roller wheels 30 shown in FIG. 2 taken about line A-A. It should be appreciated that, in the following description of FIG. 6, any elements, features, and/or components related to the track wheel 400 that are similar to those shown in one or more of the embodiments of FIG. 3-5 have been designated with the same reference numbers increased by 100 (or a multiple of 100) and redundant description has been omitted. Additionally, for purposes of illustration, the components of the hub assembly 112 shown in FIG. 6 have been designated with the same reference characters from FIGS. 3-5.

As shown in FIG. 6, the track wheel 400 may include a wheel rim 402 and a hub disc 404 extending radially within the interior of the wheel rim 402 between a radially outer end 406 and a radially inner end 408. However, unlike the embodiments described above, the wheel rim 402 has a split-rim configuration formed from first and second rim sections 402A, 402B. Specifically, as shown in FIG. 6, the track wheel 400 may include a first rim section 402A that forms a first axial portion of the wheel rim 402 extending from a first side 432 of the track wheel 400 to the axial location of the hub disc 404 and a second rim section 402B forming a second axial portion of the wheel rim 402 extending from the axial location of the hub disc 404 to a second side 434 of the track wheel 400.

In general, the first and second rim sections 402A, 402B, when assembled together, may have the same or a similar configuration to the wheel rims 102, 202, 302 described above with reference to FIGS. 3-5. For instance, the first rim section 402A may include a first outer rim wall 430A defining a first axial portion of the outer circumferential surface of the track wheel 400 and a first side wall 436 extending radially inwardly from the first outer rim wall 430A along the first side 432 of the track wheel 400 to an inner end 442 of the first side wall 436. The first rim section 402A may also include a first shield wall 450 extending axially from the inner end 442 of the first side wall 436 to an interior disc position 454 defined on the hub disc 404 at a location radially inwardly from the outer end 406 of the hub disc 404. Similarly, the second rim section 402A may include a second outer rim wall 430B defining a second axial portion of the outer circumferential surface of the track wheel 400 and a second side wall 438 extending radially inwardly from the second outer rim wall 430B along the second side 434 of the track wheel 400 to an inner end 444 of the second side wall 438. The second rim section 402B may also include a second shield wall 452 extending axially from the inner end 444 of the second side wall 438 to the interior disc position 454. Additionally, each shield wall 450, 452 may be spaced radially inwardly from its corresponding outer rim wall 430A, 430B such that a radial gap 456, 458 is defined between the shield wall 450, 452 and the outer rim wall 430A, 430B of each rim section 402A, 402B. For example, a first radial gap 456 may be defined between the first shield wall 450 and the first outer rim wall 430A and a second radial gap 458 may be defined between the second shield wall 452 and the second outer rim wall 430B. Moreover, as described above, each shield wall 450, 452 may provide a means for preventing material accumulation within an interior space(s) defined within the wheel rim 402, such as the radial gaps 456, 458.

In several embodiments, the first rim section 402A may be configured to be coupled to the second rim section 402B along a circumferential joint 474 defined around the outer perimeter of the track wheel 400. For example, as shown in FIG. 6, an axial end 476 of the first outer rim wall 430A of the first rim section 402A may be coupled (e.g., via welding) to an adjacent axial end 478 of the second outer rim wall 430B of the second rim section 402B at the circumferential joint 474 to secure the first and second rim sections 402A, 402B together. As such, when coupled together, the first and second outer rim walls 430A, 430B may generally define the entire outer circumferential surface of the track wheel 400.

Additionally, in one embodiment, the circumferential joint 474 defined between the first and second rim sections 402A, 402B may be axially offset from the attachment location(s) defined between the hub disc 404 and the shield walls 450, 452. For example, as shown in FIG. 6, the circumferential joint 474 is axially offset from a centerline of the hub disc 404 defined through the inner end 408 of the hub disc 404 by an axial distance 480. In such an embodiment, the hub disc 404 may, for instance, define a contoured or non-planar profile such that the outer end 406 of the hub disc 404 is axially offset from the centerline of the hub disc 404 by the same or a similar distance 480 such that the outer end 406 of the hub disc 402 may be coupled to the first and/or second outer rim wall 430A, 430B at and/or adjacent to the circumferential joint 474.

Referring now to FIG. 7, a cross-sectional view of an even further embodiment of a configuration for a track wheel 500 suitable for use within a track assembly of a work vehicle is illustrated in accordance with aspects of the present subject matter. For instance, the track wheel 500 may correspond to one of the roller wheels 30 of the track assembly 12, 14 shown in FIG. 2. In such an embodiment, the cross-sectional view of FIG. 7 may, for example, correspond to a view of one of the roller wheels 30 shown in FIG. 2 taken about line A-A. It should be appreciated that, in the following description of FIG. 7, any elements, features, and/or components related to the track wheel 500 that are similar to those shown in one or more of the embodiments of FIG. 3-6 have been designated with the same reference numbers increased by 100 (or a multiple of 100) and redundant description has been omitted. Additionally, for purposes of illustration, the components of the hub assembly 112 shown in FIG. 7 have been designated with the same reference characters from FIGS. 3-6.

As shown in FIG. 7, the track wheel 500 may include a wheel rim 502 and a hub disc 504 extending radially within the interior of the wheel rim 502 between a radially outer end 506 and a radially inner end 508. Similar to the embodiment shown in FIG. 6, the wheel rim 502 may have a split-rim configuration formed from first and second rim sections 502A, 502B. In general, the rim sections 502A, 502B may be configured the same as or similar to the rim sections 402A, 402B described above. For example, the first rim section 502A may be configured to form a first axial portion of the wheel rim 502 extending from a first side 532 of the track wheel 500 towards the axial location of the hub disc 504 while the second rim section 502A may be configured to form a second axial portion of the wheel 500 extending from the axial location of the hub disc 504 to a second side 534 of the track wheel 500. Additionally, the first rim section 502A may include a first outer rim wall 530A defining a first axial portion of the outer circumferential surface of the track wheel 500 and a first side wall 536 extending radially inwardly from the first outer rim wall 530A along the first side 532 of the track wheel 500 to an inner end 542 of the first side wall 536. The first rim section 502A may also include a first shield wall 550 extending axially from the inner end 542 of the first side wall 536 to an interior disc location 554 defined on the hub disc 504 at a location radially inwardly from the outer end 506 of the hub disc 504. Similarly, the second rim section 502B may include a second outer rim wall 530B defining a second axial portion of the outer circumferential surface of the track wheel 500 and a second side wall 538 extending radially inwardly from the second outer rim wall 530B along the second side 534 of the track wheel 500 to an inner end 544 of the second side wall 538. The second rim section 502B may also include a second shield wall 552 extending axially from the inner end 544 of the second side wall 538 to the interior disc location 554. In addition, as shown in FIG. 7, each shield wall 550, 552 may be spaced radially inwardly from its corresponding outer rim wall such that a radial gap 556, 558 is defined between the shield wall 550, 552 and the outer rim wall 530A, 530B of each rim section 502A, 502B. Moreover, as described above, each shield wall 550, 552 may provide a means for preventing material accumulation within an interior space(s) defined within the wheel rim 502, such as the radial gaps 556, 558.

Moreover, as shown in FIG. 7, the first rim section 502A may be configured to be coupled to the second rim section 502B along a circumferential joint 574 defined around the outer perimeter of the track wheel 500. However, unlike the embodiment described above with reference to FIG. 6, the wheel rim 502 includes a circumferential joint 574 defined between the first and second rim sections 502A, 502B that is generally axially aligned with the attachment location(s) defined between the hub disc 504 and the shield walls 550, 552. Additionally, unlike the non-planar profiles described above, the hub disc 504 defines a contoured or non-planar profile that forms a hook-like shape along the radially outer portion of the disc 504. In such an embodiment, despite the non-planar profile, the outer end 506 of the hub disc 504 may generally be axially aligned with the inner end 508 of the hub disc 504.

Referring now to FIG. 8, a cross-sectional view of another embodiment of a configuration for a track wheel 600 suitable for use within a track assembly of a work vehicle is illustrated in accordance with aspects of the present subject matter. For instance, the track wheel 600 may correspond to one of the roller wheels 30 of the track assembly 12, 14 shown in FIG. 2. In such an embodiment, the cross-sectional view of FIG. 8 may, for example, correspond to a view of one of the roller wheels 30 shown in FIG. 2 taken about line A-A. It should be appreciated that, in the following description of FIG. 8, any elements, features, and/or components related to the track wheel 600 that are similar to those shown in one or more of the embodiments of FIG. 3-7 have been designated with the same reference numbers increased by 100 (or a multiple of 100) and redundant description has been omitted. Additionally, for purposes of illustration, the components of the hub assembly 112 shown in FIG. 8 have been designated with the same reference characters from FIGS. 3-7.

As shown in FIG. 8, the track wheel 600 may include a wheel rim 602 having a split-rim configuration similar to the embodiment described above with reference to FIG. 7. For example, the wheel rim 602 may be formed from first and second rim sections 602A, 602B configured to be coupled to one another at a circumferential joint 674 defined around an outer perimeter of the wheel 600. In such an embodiment, the first rim section 602A may include a first outer rim wall 630A defining a first axial portion of the outer circumferential surface of the track wheel 600 and a first side wall 636 extending radially inwardly from the first outer rim wall 630A along a first side 632 of the track wheel 600 to an inner end 642 of the first side wall 636. The first rim section 602A may also include a first shield wall 650 extending axially from the inner end 642 of the first side wall 636 towards a second side 634 of the track wheel 600. Similarly, the second rim section 602B may include a second outer rim wall 630B defining a second axial portion of the outer circumferential surface of the track wheel 600 and a second side wall 638 extending radially inwardly from the second outer rim wall 630B along the second side 634 of the track wheel 600 to an inner end 644 of the second side wall 638. The second rim section 602B may also include a second shield wall 652 extending axially from the inner end 644 of the second side wall 638 towards the first side 632 of the track wheel 600. In addition, as shown in FIG. 8, each shield wall 650, 652 may be spaced radially inwardly from its corresponding outer rim wall 630A, 630B such that a radial gap 657 is defined between the shield walls 650, 652 and the outer rim walls 630A, 630B of the rim sections 602A, 602B. Moreover, as described above, each shield wall 650, 652 may provide a means for preventing material accumulation within an interior space(s) defined within the wheel rim 602, such as the radial gap 657.

However, unlike the previously described split-rim configuration, the track wheel 600 includes a hub disc 604 formed integrally with the wheel rim 602. Specifically, in several embodiments, the first and second rim sections 602A, 602B may each include a radially extending wall 682, 684 configured to form a part of the hub disc 604. For example, as shown in FIG. 8, the first rim section 602A may include a first disc wall 682 extending radially inwardly from the first shield wall 650 that is configured to form a first axial section or half of the hub disc 604 while the second rim section 602B may include a second disc wall 684 extending radially inwardly from the second shield wall 652 that is configured to form a second axial section or half of the hub disc 604. In such an embodiment, the first and second rim sections 602A, 602B may be coupled together at a radial interface 686 defined between the first and second disc walls 682, 684 such that the disc walls 682, 684 collectively define a hub disc 604 for coupling the track wheel 600 to the hub assembly 112. As shown in FIG. 8, in one embodiment, the radial interface 686 defined between the disc walls 682, 684 may be axially aligned with the outer circumferential joint 674 defined between the first and second rim sections 602A, 602B. Alternatively, the radial interface 686 may be axially offset from the outer circumferential joint 674.

Referring now to FIG. 9, a cross-sectional view of a further embodiment of a configuration for a track wheel 700 suitable for use within a track assembly of a work vehicle is illustrated in accordance with aspects of the present subject matter. For instance, the track wheel 700 may correspond to one of the roller wheels 30 of the track assembly 12, 14 shown in FIG. 2. In such an embodiment, the cross-sectional view of FIG. 9 may, for example, correspond to a view of one of the roller wheels 30 shown in FIG. 2 taken about line A-A. It should be appreciated that, in the following description of FIG. 9, any elements, features, and/or components related to the track wheel 7600 that are similar to those shown in one or more of the embodiments of FIG. 3-8 have been designated with the same reference numbers increased by 100 (or a multiple of 100) and redundant description has been omitted. Additionally, for purposes of illustration, the components of the hub assembly 112 shown in FIG. 9 have been designated with the same reference characters from FIGS. 3-8.

As shown in FIG. 9, the track wheel 700 may include a wheel rim 702 having a split-rim configuration similar to the embodiment described above with reference to FIG. 8. For example, the wheel rim 702 may be formed from first and second rim sections 702A, 702B configured to be coupled to one another at a circumferential joint 774 defined around an outer perimeter of the wheel. In such an embodiment, the first rim section 702A may include a first outer rim wall 730A defining a first axial portion of the outer circumferential surface of the track wheel 700 and a first side wall 736 extending radially inwardly from the first outer rim wall 730A along a first side 732 of the track wheel 700 to an inner end 742 of the first side wall 736. The first rim section 702A may also include a first shield wall 750 extending axially from the inner end 742 of the first side wall 736 towards a second side 734 of the track wheel 700. Similarly, the second rim section 702B may include a second outer rim wall 730B defining a second axial portion of the outer circumferential surface of the track wheel 700 and a second side wall 738 extending radially inwardly from the second outer rim wall 730B along the second side 734 of the track wheel 700 to an inner end 744 of the second side wall 738. The second rim section 702B may also include a second shield wall 752 extending axially from the inner end 744 of the second side wall 738 towards the first side 732 of the track wheel 700. In addition, as shown in FIG. 9, each shield wall 750, 752 may be spaced radially inwardly from its corresponding outer rim wall 730A, 730B such that a radial gap 757 is defined between the shield walls 750, 752 and the outer rim walls 730A, 703B of the rim sections 702A, 702B. Moreover, as described above, each shield wall 750, 752 may provide a means for preventing material accumulation within an interior space(s) defined within the wheel rim 702, such as the radial gap 757.

However, unlike the previously described split-rim configuration, the track wheel 700 includes a hub disc 704 formed integrally with the first rim section 702A. Specifically, as shown in FIG. 9, the first rim section 702A may include a first disc wall 782 extending radially inwardly from the first shield wall 750 that forms the hub disc 704 of the track wheel 700. In such an embodiment, the second shield wall 752 of the second rim section 702B may be coupled to the first rim section 702B at or adjacent to the intersection between the first shield wall 750 and the first disc wall 782 along an inner circumferential joint 790 defined between the first and second rim sections 702A, 702B. As shown in FIG. 9, in one embodiment, the inner circumferential joint 790 may be axially aligned with the outer circumferential joint 774 defined between the first and second rim sections 702A, 702B. Alternatively, the inner circumferential joint 790 may be axially offset from the outer circumferential joint 774.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A track wheel for use within a track assembly of a work vehicle, the track wheel comprising:
    a wheel rim including an outer rim wall extending axially between a first side and a second side of the track wheel, the wheel rim further including a first side wall extending radially inwardly from the outer rim wall along the first side of the wheel such that an inner end of the first side wall is spaced radially inwardly from the outer rim wall;
    a hub disc extending radially within the wheel rim between a radially inner end and a radially outer end, the radially outer end being axially offset from the radially inner end, the radially inner end defining a central opening configured to receive at least a portion of a hub assembly of the work vehicle, the radially outer end being positioned adjacent to a portion of the wheel rim; and
    a first shield wall extending axially between the inner end of the first side wall and the hub disc, the first shield wall being spaced radially inwardly from the outer rim wall such that a radial gap is defined between the first shield wall and the outer rim wall, the first shield wall and the hub disc partially defining a cavity exposed to an operating environment of the work vehicle,
    wherein the outer rim wall defines an outer circumferential surface of the wheel rim having a cylindrical shape extending from the first side wall towards the second side of the track wheel to at least an axial location of the radially outer end of the hub disc.

2. The track wheel of claim 1, wherein the outer rim wall is a first outer rim wall of the wheel rim and wherein the first outer rim wall and the first side wall form part of a first rim section of the wheel rim, further comprising:
    a second rim section including a second outer rim wall coupled to the first outer rim wall at a circumferential joint defined between the first and second rim sections, the second outer rim wall extending axially between the circumferential joint and the second side of the wheel, the second rim section further including a second side wall extending radially inwardly from the second outer rim wall along the second side of the wheel such that an inner end of the second side wall is spaced radially inwardly from the second outer rim wall.

3. The track wheel of claim 2, further comprising a second shield wall extending axially between the inner end of the second side wall and the hub disc, the second shield wall being spaced radially inwardly from the second outer rim wall such that a second radial gap is defined between the second shield wall and the second outer rim wall.

4. The track wheel of claim 3, wherein the second shield wall is coupled to at least one of the first shield wall or the hub disc at an inner circumferential joint spaced radially inwardly from the first and second outer rim walls.

5. The track wheel of claim 3, wherein the second shield wall forms part of the second rim section such that the second outer rim wall, the second side wall, and the second shield portion are all formed integrally with one another.

6. The track wheel of claim 3, wherein the first and second shield walls are coupled to the hub disc at locations spaced radially inwardly from the first and second outer rim sections.

7. The track wheel of claim 2, wherein the circumferential joint is axially aligned with the radially inner end of the hub disc.

8. The track wheel of claim 2, wherein the circumferential joint is axially offset from the radially inner end of the hub disc.

9. The track wheel of claim 2, wherein the first and second outer rim walls both have cylindrical shapes such that the wheel rim defines a continuous cylindrical shape extending axially from the first side wall to the second side wall.

10. The track wheel of claim 1, further comprising:
    a second side wall extending radially inwardly from the outer rim wall along the second side of the wheel such that an inner end of the second side wall is spaced radially inwardly from the outer rim wall; and
    a second shield wall extending axially between the inner end of the second side wall and the hub disc, the second shield wall being spaced radially inwardly from the outer rim wall such that a second radial gap is defined between the second shield wall and the outer rim wall.

11. The track wheel of claim 10, wherein the first and second shield walls form cone-shaped sections extending axially between the hub disc and the first and second sides of the wheel.

12. The track wheel of claim 1, further comprising a separate shield component extending between the hub disc and the second side of the wheel, the shield component including a second side wall coupled to the outer rim wall and extending radially inwardly from the outer rim wall to an inner end, the shield component further including a second shield wall extending axially between the inner end of the second side wall and the hub disc, the second shield wall being spaced radially inwardly from the outer rim wall such that a second radial gap is defined between the second shield wall and the outer rim wall.

13. The track wheel of claim 1, wherein the radially outer end of the hub disc is coupled to or formed integrally with a portion of the wheel rim.

14. The track wheel of claim 1, wherein the first shield wall is coupled to the hub disc at a location spaced radially inwardly from the radially outer end of the hub disc.

15. A track wheel for use within a track assembly of a work vehicle, the track wheel comprising:
   a wheel rim including an outer rim wall extending axially between a first side and a second side of the track wheel, the wheel rim further including a first side wall extending radially inwardly from the outer rim wall along the first side of the wheel such that an inner end of the first side wall is spaced radially inwardly from the outer rim wall;
   a hub disc extending radially within the wheel rim between a radially inner end and a radially outer end, the radially outer end being axially offset from the radially inner end, the radially inner end defining a central opening configured to receive at least a portion of a hub assembly of the work vehicle, the radially outer end being positioned adjacent to a portion of the wheel rim; and
   means including a side wall for preventing material accumulation within an interior space of the track wheel, the interior space being defined radially inwardly from the outer rim wall and extending axially between the first side wall and the hub disc, the interior space including a cavity that is exposed to an operating environment of the work vehicle, the cavity being partially defined by the hub disc and the side wall,
   wherein the outer rim wall defines an outer circumferential surface of the wheel rim having a cylindrical shape extending from the first side wall towards the second side of the track wheel to at least an axial location of the radially outer end of the hub disc.

16. A track assembly for a work vehicle, the track assembly comprising:
   a track;
   a drive wheel configured to rotationally drive the track around a drive loop; and
   a roller wheel configured to engage the track as the track is driven around the drive loop, the roller wheel comprising:
      a wheel rim including an outer rim wall extending axially between a first side and a second side of the roller wheel, the wheel rim further including a first side wall extending radially inwardly from the outer rim wall along the first side of the wheel such that an inner end of the first side wall is spaced radially inwardly from the outer rim wall;
      a hub disc extending radially within the wheel rim between a radially inner end and a radially outer end, the radially outer end being axially offset from the radially inner end, the radially inner end defining a central opening configured to receive at least a portion of a hub assembly of the work vehicle, the radially outer end being positioned adjacent to a portion of the wheel rim; and
      a first shield wall extending axially between the inner end of the first side wall and the hub disc, the first shield wall being spaced radially inwardly from the outer rim wall such that a radial gap is defined between the first shield wall and the outer rim wall, the first shield wall and the hub disc partially defining a cavity exposed to an operating environment of the work vehicle,
   wherein the outer rim wall defines an outer circumferential surface of the wheel rim having a cylindrical shape extending from the first side wall towards the second side of the track wheel to at least an axial location of the radially outer end of the hub disc.

* * * * *